(12) United States Patent
Wugofski et al.

(10) Patent No.: US 7,707,613 B1
(45) Date of Patent: Apr. 27, 2010

(54) INDIVIDUALIZED PARAMETER CONTROL FOR MULTIPLE MEDIA SOURCES IN A DATA PROCESSING SYSTEM

(75) Inventors: Theodore D. Wugofski, Fort Worth, TX (US); Kim C. Smith, Colleyville, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/002,990

(22) Filed: Jan. 5, 1998

(51) Int. Cl.
 *H04N 7/18* (2006.01)

(52) U.S. Cl. .............................. 725/80; 725/82; 725/38; 725/40; 725/43; 725/47; 725/48; 725/59; 725/133; 725/141; 725/153

(58) Field of Classification Search .................... 725/38, 725/40, 43, 47, 48, 59, 80, 133, 141, 153; 345/716, 717, 737, 744
See application file for complete search history.

(56) References Cited

U.S. PATENT DOCUMENTS

| | | | | |
|---|---|---|---|---|
| 5,257,106 A | * | 10/1993 | Maruoka | 348/731 |
| 5,389,963 A | * | 2/1995 | Lepley et al. | 725/144 |
| 5,446,505 A | * | 8/1995 | Chang Soo et al. | 348/563 |
| 5,450,079 A | * | 9/1995 | Dunaway | 341/23 |
| 5,532,753 A | * | 7/1996 | Buchner et al. | 725/56 |
| 5,550,576 A | * | 8/1996 | Klosterman | 348/906 |
| 5,650,827 A | * | 7/1997 | Tsumori et al. | 725/59 |
| 5,687,334 A | * | 11/1997 | Davis et al. | 345/764 |
| 5,767,919 A | * | 6/1998 | Lee et al. | 725/37 |
| 5,815,297 A | * | 9/1998 | Ciciora | 359/146 |
| 5,822,018 A | * | 10/1998 | Farmer | 348/705 |
| 5,880,792 A | * | 3/1999 | Ward et al. | 348/722 |
| 5,889,506 A | * | 3/1999 | Lopresti et al. | 345/158 |
| 5,923,362 A | * | 7/1999 | Klosterman | 348/569 |
| 5,926,207 A | * | 7/1999 | Vaughan et al. | 725/139 |
| 5,945,988 A | * | 8/1999 | Williams et al. | 345/747 |
| 5,990,883 A | * | 11/1999 | Byrne et al. | 345/721 |
| 6,052,740 A | * | 4/2000 | Frederick | 348/554 |
| 6,069,621 A | * | 5/2000 | Schupak | 345/717 |
| 6,133,910 A | * | 10/2000 | Stinebruner | 725/49 |
| 6,229,575 B1 | * | 5/2001 | Vaughan et al. | 348/564 |
| 6,263,502 B1 | * | 7/2001 | Morrison et al. | 348/563 |
| 6,323,873 B1 | * | 11/2001 | Liebenow | 345/619 |
| 6,363,204 B1 | * | 3/2002 | Johnson et al. | 345/718 |

FOREIGN PATENT DOCUMENTS

| | | |
|---|---|---|
| EP | 0543089 | 5/1993 |
| GB | 2208981 | 4/1989 |
| GB | 2326547 | 12/1998 |

* cited by examiner

*Primary Examiner*—Jason P Salce

(57) ABSTRACT

A multimedia system has multiple media sources switchable under user control to a common set of output presentation devices. A table stores parameter values for each media source separately, so that selection of a source changes the parameters of the displayed media to values appropriate for that source. A user input device has selection keys, and also has keys for modifying the values of the parameters. The modified parameter values are stored in the table, so that they persist when the same media device is selected at a later time.

44 Claims, 9 Drawing Sheets

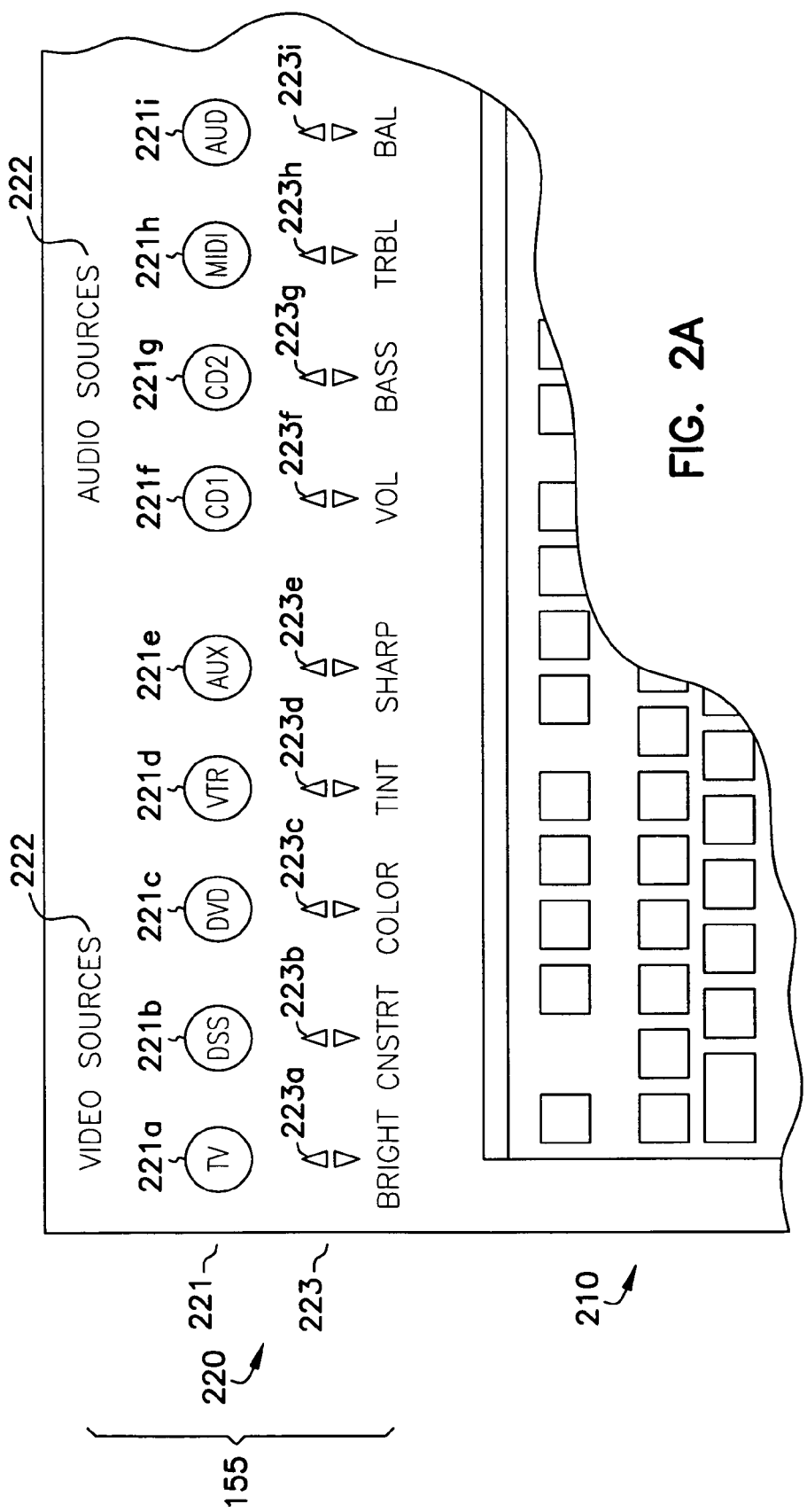

| | BRIGHT | CONTR | COLOR | TINT | SHARP | VOL | BASS | TRBL | BAL |
|---|---|---|---|---|---|---|---|---|---|
| TV | 128 | 128 | 117 | 98 | 128 | 101 | 128 | 128 | 128 |
| DSS | 128 | 128 | 117 | 98 | 212 | 101 | 128 | 128 | 128 |
| DVD | 128 | 128 | 114 | 102 | 235 | 125 | 185 | 128 | 128 |
| VTR | 125 | 120 | 117 | 100 | 103 | 100 | 185 | 136 | 128 |
| AUX | 000 | 000 | 000 | 000 | 000 | 000 | 000 | 000 | 000 |
| CD1 | | | | | | 212 | 137 | 141 | 108 |
| CD2 | | | | | | 105 | 130 | 130 | 128 |
| MIDI | | | | | | 128 | 128 | 128 | 128 |
| AUX | | | | | | 000 | 000 | 000 | 000 |

FIG. 3A

INDIVIDUALIZED PARAMETER CONTROL FOR MULTIPLE MEDIA SOURCES IN A DATA PROCESSING SYSTEM

RELATED APPLICATIONS

This application is related to the co-assigned and co-filed applications, "Method for managing multiple channel maps from multiple input devices in a multimedia system," Ser. No. 09/002,762, filed Jan. 5, 1998 (U.S. Pat. No. 6,003,041); "System for time-shifting events in a multi-channel convergence system," Ser. No. 09/002,580, filed Jan. 5, 1998; "Method and system for associating web sites to television programs," Ser. No. 09/002,593, filed Jan. 5, 1998; "System for combining electronic program guide data," Ser. No. 09/002,972, filed Jan. 5, 1998; "System for scheduled caching of in-band data services," Ser. No. 09/002,584, filed Jan. 5, 1998; and "Integration of Internet sources into an electronic program database list," all of which are hereby incorporated by reference.

BACKGROUND OF THE INVENTION

The present invention involves electronic data processing, and more particularly concerns improved control of signal parameter values in a multimedia system having many different media sources feeding single system-presentation devices.

Personal computers are evolving in several different directions. One of those directions leads toward a larger system including multimedia inputs from many different sources, presented to a user or a group of users simultaneously through a set of system output devices which have a configuration similar to that of an entertainment center or a home theater. This type of personal computer converges the capabilities of previously separate systems into a single system having greater capabilities than the sum of its parts, and at the same time reducing cost by eliminating the duplication of components providing the same function in the separate systems. An example of such a "converged system" is the publicly available Destination® PC/TV system from Gateway 2000. This product permits a user to enjoy the capabilities of both a personal computer system and a high-quality television system at a lower total cost than that of two separate systems.

One of the advantages of a convergence system is the availability of enough computing power to integrate many media input devices, such as direct-broadcast satellite receivers, compact disc and digital video disc players, video cassette recorders, and cameras, and to control their functions from a single central point such as a remote keyboard.

One of the disadvantages of a convergence system is that the output signal of each media device has characteristics and parameter values that differ from those of other media devices. Although a television tuner and a video disc player may both have connectors labeled "line out," the video and audio voltage levels, contrast compression, frequency bandwidths, and other parameters or characteristics of the two signals are almost always different enough to produce noticeable and often irritating differences when a common audio or audio/video output device presents them to a user. Even within A user may also wish to have different parameter values for different signals from the same device. For example, the sound level for movie channels of a satellite receiver will generally be higher than the level for a news channel.

Many computer systems, as well as other multiple-input systems, include controls for adjusting the parameters of the signal transmitted to the presentation devices, the display monitor and/or loudspeakers. However, these are "master" controls, which adjust the parameters to the same values for all input devices. When users switch to another source, they must adjust the parameters again for the second device.

Some media devices include manually adjustable controls, permitting a user to set the signal parameters from that device to values such that connecting multiple devices to a single presentation device does not produce an irritating jump when sources are switched.

Frequently, however, a user wishes to adjust the signal parameters of the current input device or channel, say to accommodate temporary changes in the program quality or viewing position, without altering the parameters for other input devices or other channels. Changing the parameters with master controls requires constant readjustment. Adjusting individual manual controls usually involves tricky adjustments in controls which are inconveniently positioned and whose locations have been forgotten. Moreover, adjusting such controls from an actual viewing position is much easier than when leaning over the rear of a large display monitor.

SUMMARY OF THE INVENTION

The present invention provides facilities for separately adjusting the signal parameters of each of multiple input devices to a common output or presentation means. The adjustment uses a single parameter-modification facility for all devices. A single table contains stored values for a number of parameters for each input device separately, arranged as a set of entries for each device. When a user selects a device, the entry or record pertaining to that device transmits its parameter values to a facility for modifying the signal from the selected input device to the presentation devices. This permits the display device to behave as though each input device included individual adjustment controls.

A single set of parameter-adjustment controls permits a user to modify the value of any parameter for the currently selected input device. The new parameter value replaces the previous value for that parameter only in the table entry for the currently selected device, and takes effect in the presentation device immediately. Combining the parameter controls with the selection facility at the viewing location also permits the user to observe the effects of the changes immediately.

Further aspects and features of the invention, as well as variations obvious to those of ordinary skill in the art, will appear from the following description of a preferred embodiment thereof.

BRIEF DESCRIPTION OF THE DRAWINGS

FIGS. 2A, 2B, 2C, and 2D, show the details of different configurations for the user-control device of FIG. 1.

FIG. 3, comprising FIGS. 3A and 3B, illustrate parameter tables of FIG. 1.

DETAILED DESCRIPTION OF THE EMBODIMENTS

The following detailed description refers to the accompanying drawing which forms a part hereof, and which shows by way of illustration specific embodiments in which the invention may be practiced. These embodiments are described in sufficient detail to enable those skilled in the art to practice the invention. Other embodiments may be employed, and logical, mechanical and electrical changes may be made without departing from the spirit and scope of the present invention. The following detailed description is, therefore, not to be taken in a limiting sense; rather, the scope of the invention is defined only by the appended claims.

Figure 1:
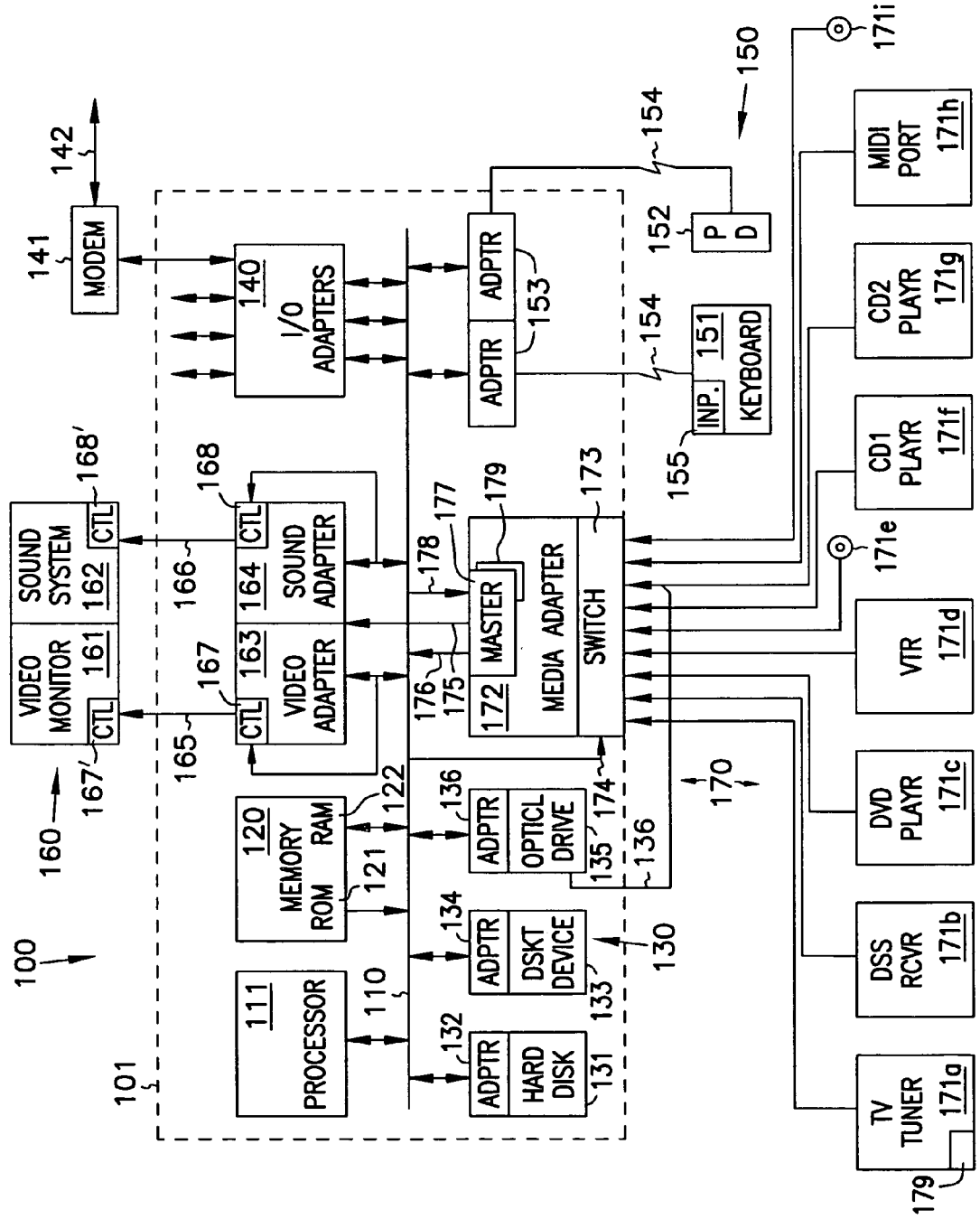
FIG. 1 shows an overall multimedia computer system incorporating the present invention FIG. 2, comprising

FIG. 1 is a high-level block diagram of hardware for a multimedia convergence system 100. Embodiments of the present invention may be included in, or developed in conjunction with, a software architecture of a computerized convergence system as described in commonly assigned U.S. patent application entitled "Architecture for Convergence Systems," filed on even date herewith, which application is hereby incorporated by reference.

One or more conventional buses 110 interconnect a processor unit 111 to a number of other subsystems. Memory 120 commonly includes ROM 121 for holding BIOS and other low-level fixed program code and system data; RAM 122 holds an operating system, application programs, data, and other information. Internal off-line storage subsystem 130 may include a hard disk 131 with its bus adapter 132, and one or more removable media facilities, such as diskette drive 133 and adapter 134, and optical (CD-ROM, CD-RW, DVD, etc.) drives 135 and adapter 136. The components of subsystem 130 normally reside within the same physical enclosure, indicated by dashed line 101. Standard I/O adapters 140 may connect system 100 to external devices such as printers, and local-area networks (not shown). A modem 141 commonly connects to a standard serial interface in adapters 140 for connection via line 142 to a telephone line, ISDN line, or similar communications device (not shown).

Devices 150 for accepting user input to control system 100 may include a keyboard 151 and a pointing device 152, along with their bus interfaces or adapters 153. In most present personal computers, user input devices attach to internal adapters by wires. In a convergence system of the type to be described, however, it may be preferable instead to attach them to adapters 153 by wireless RF or infra-red (IR) links 154. Also, pointing device may take the form of a handheld remote having a trackball and a number of keys, rather than the more traditional desktop mouse. Numeral 155 calls out the user-input facility employed by the present invention, described in detail below. Facility 155 may be located on pointing device 152 or even in a separate housing, rather than on keyboard 151. It is important in any case that facility 155 be capable of operation from a position where the user normally views and listens to the system output devices 160.

System output devices 160 commonly include a video monitor 161 and an audio system 162 connected to internal system adapters 163 and 164 by wiring 165 and 166. In a converged system such as 100, the monitor may have a larger screen size and more features than those for a traditional PC, and the audio components may include a multichannel amplifier and more numerous, higher-quality loudspeakers. Video adapter 163 is commonly a card plugged into to an internal ISA or PCI slot for accepting digital video data from bus 110, storing it, processing it in some cases, and converting it to analog signals for transmission to monitor 161. Sound adapter 164 is usually a separate card plugged into an ISA slot in bus 110; it accepts digital data representing sounds from the bus, it may generate the digital waveform from a coded representation such as MIDI, and it converts the digital waveforms to analog form. In a convergence multimedia system such as 100, adapters 163 and 164 may be physically and electrically integrated with each other and share some functions; they may also be physically located within the output devices, rather than within computer enclosure 101. Parameter controllers 167 and 168, described more fully below, hold digital values representing certain parameters employed in the invention, and modify the signals from the input devices in accordance with the parameter values. These controllers may be physically located either on adapter cards 163 and 164 for affecting the video and audio signals transmitted over wiring 165 and 166, or for relaying the control signals to the system output devices for affecting the device parameters there. Control registers 167 and 168 may instead be physically located in the devices, as indicated by dashed blocks 167' and 168'; the control signals would then be transmitted directly to the devices via wiring 165 and 166.

Media input subsystem 170 selectively couples a number of media sources 171 to the set of system output devices 160. The input devices may include a number of video (actually audio/video) sources such as a television tuner 171*a*, a digital satellite service (DSS) receiver 171*b*, digital video disc (DVD) player 171*c*, a video tape recorder (VTR) 171*d*, and a plug 171*e* for an auxiliary video source; a number of audio sources may include a compact-disc (CD) player 171*f* and changer 171*g*, a port 171*h* for a standard musical-instrument digital interface (MIDI) signal, and an auxiliary audio source 171*i*. Other devices, and devices for other types of media, may be connected as well. Some of these devices, such as TV 171*a* and DSS receiver 171*b*, receive signals on multiple channels; others, such as CD player 171*f*, usually receive only a single signal. For convenience, devices capable of receiving multiple selectable input signals or channels will be called "tunable" devices, although it is to be understood that the signals or channels might be selected by operations other than frequency tuning. Likewise, the term "channel" must be understood in a broad sense as referring to different media content from a single device, whether the content be a signal of a different frequency, a different disc in a carousel CD player, or any other selection from a single device.

Normally, most of the input devices are physically located externally to the main system enclosure 101, mostly because they are physically large in comparison with a personal computer, and because they have been commonly used separately from a personal computer. In a convergence system of the present type, however, it may be both desirable and possible to locate some or all of them within the same enclosure. TV tuners, for example, now exist as single cards for use with the monitor of the PC as its only output device, and many PCS include facilities for playing audio discs from the built-in CD-ROM players whose primary purpose is to enter programs and data into the computer, using the small system speakers as output devices. (In FIG. 1, internal CD player 135 may serve as one of the media input devices, say 171*d*, merely by connecting its audio output to adapter 172 in place of an external drive such as 171*f*, as indicated by line 136.)

Adapter 172 receives media input signals from all of the input devices 171. This adapter may take the form of a single card plugged into bus 110, multiple cards on the bus, or any other suitable configuration. In some systems, it may be desirable to locate the adapter within enclosure 101, as shown in FIG. 1. In other systems, it may be more convenient to construct the adapter and its components as a separate unit, perhaps as a set-top box physically located on or near one or more of the devices 171. A switch or multiplexer 173 responds to a channel-control signal on line 174 for selecting one of the input signals and passing it to the appropriate system output devices 160. Control signal 174 may proceed from keyboard 151, either directly or through a program running in processor 111. Adapter 172 may, if desired, perform any conventional form of signal-processing, mixing, and/or other conventional functions upon the input signals, either before or after selecting them in switch 173. The selected input signal then proceeds to output devices for presentation via line 175 to devices 161-162 or via their internal adapters 163-164. Alternatively (or in addition), line 176 may carry the signal to bus 110 for manipulation in a digital form by a program executing in processor 111, and thence to output subsystem 160 for presentation.

In addition to the other facilities for modifying parameters of individual devices, system 100 also includes a master or system parameter control. Master controller 177 contains register locations for holding a value of each parameter (brightness, contrast, etc.) that modifies the corresponding parameter of whichever signal is selected as the system input by switch 173. That is, controller 177 modifies the parameter values of all signals on lines 115 and 176, to provide a "system level" baseline, about which the user can vary the parameters separately for each input device. This provides a way to match the system output devices 160 more closely to signal values common to many input devices 170, and also provides a way for a user to change quickly a parameter, such as volume, temporarily to a lower level without having to select or reselect an input device first. The register locations may be realized in nonvolatile memory, or stored and reloaded for each session, to provide persistent control across multiple sessions. Controller 177 could be placed at other locations within system 100, and it could exist as multiple pieces in different locations. It receives parameter values from bus 110 on lines 178.

FIG. 2A shows a portion of keyboard 151, FIG. 1, that serves as a user-entry device 155 for the invention. A conventional array of data-entry keys 210 occupies the usual area of the keyboard. An area 220 above these keys, and extending at least partially across the width of the keyboard on the keyboard enclosure, holds other controls for interacting with system 100. Dedicated input-selection buttons or keys 221 select one of the sources 171, FIG. 1. These buttons are preferably visually distinct from data-entry keys 210, and may comprise round buttons having limited travel and a distinctive tactile feel, such as a slightly domed rubbery surface, and raised only a few millimeters above the surface of area 220. Source-selection buttons 221 are divided into a group 221*a*-221*e* for video sources and a group 221*f*-221*i* for audio inputs. A printed label 222 identifies each group, and the name of the individual source appears on its button. Preferably, depression of a button produces the same type of scan code as that conventionally produced by data-entry keys 210. Connection 154, FIG. 1, then sends any of these scan codes to adapter 153 in the same manner as those from the other keyboard keys.

Parameter-control buttons or keys 223 are positioned below selection buttons 221 in area 220. Buttons 223 also preferably have a size, shape, and feel distinct from data-entry keys 210. In FIG. 2A, a pair of triangular buttons modifies each parameter for the selected source. Button pair 223*a* controls the brightness of the video for selected source on monitor 161, FIG. 1. Pressing the upper button increases the brightness, while pressing the lower one decreases brightness. Buttons 223*b*-223*e* control the contrast, color, tint, and video sharpness parameters in the same manner. Buttons 223*f*-223*i* control parameters of the audio signal for the selected source. Because buttons 223 are smaller, their labels are printed on the keyboard surface, rather than on the buttons themselves. Although the video and audio control buttons are grouped with the selection buttons for audio and video sources respectively, the audio controls affect the indicated audio parameters of the video sources, as well as those of the strictly audio sources. Buttons 223 generate and transmit scan codes in the same way as described for the selection buttons 221. Instead of being pairs of separate buttons, the control for each parameter could be a rocker switch or similar conventional means. Keyboard 151 may produce a scan code once for every depression of a button 223; alternatively, a single depression could produce a timed sequence of scan codes as long as the button is held down.

For tunable devices 171 capable of receiving multiple channels, stations, or other multiple input signals, the user may select particular channels via data keys 210, or in any other conventional manner.

Figure 2B:
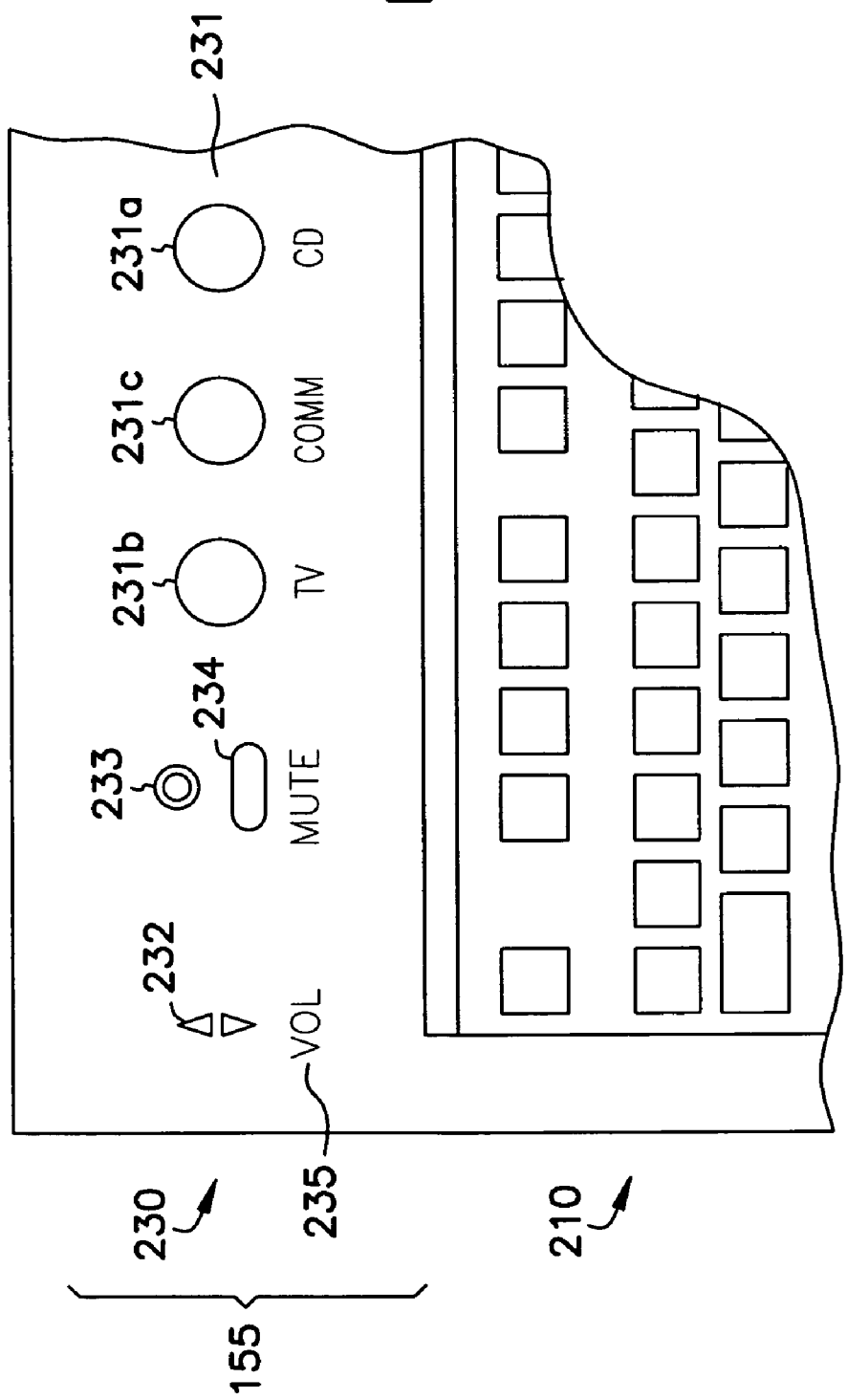

FIG. 2B shows a portion of another keyboard configuration serving as a user input facility 155 for entering selection choices and parameter values. Source-selection buttons 231 for the labeled audio sources are grouped together in area 230 of keyboard 151. Button 231*a* selects a CD player, as above. Button 231*b* selects the sound from a TV; that is, button 231*b* may route the sound from a video source as well as from a strictly audio source. Button 231*c* selects the system's modem 141 as a sound source. Although the modem is not strictly a media source, system users often wish to hear the progress of a modem line-connection sequence. Conventional systems therefore route the analog modem signal to the system speakers 162 while a connection is being established. Button 231*c* may select the modem signal to the exclusion of other audio sources, or may mix it with the previously selected source during the connection interval. Alternatively, the modem audio signal might be permanently mixed with the selected source, in which case pressing button 231*c* merely causes adapter 172 to select the modem signal on line 142 for modification by parameter-control keys 232.

Parameter-control buttons 232 modify the volume of whichever audio source is currently selected by buttons 231. FIG. 2B also illustrates additional methods for controlling device parameters. In a first alternative, a user continues to depress a source-selection button after pressing it to select a source device 171. During the time this button remains depressed, the user may press one of the parameter-control buttons 232 to increase or decrease the volume parameter. A second alternative employs a defined time interval or duration. After a selection button 231 is pressed and released, an indicator such as visible light-emitting diode (LED) 233 blinks for a few seconds. During this interval, the user may adjust the volume of the selected source by pressing one of the parameter-control buttons 232. A third alternative incorporates either of the first two, and adds another function: if the user presses a parameter-control button 233 without holding down the selection key, or outside the interval indicated by LED 233, the effect is to adjust a master volume-parameter level common to all input signals from all audio sources, as described below in connection with FIG. 5. FIG. 2B also includes a mute toggle button 234. This button is located within the same keyboard area 230 as the source-selection and parameter-control buttons, but it affects all audio sources independently of them. Labels 235 appear in a single row for all buttons. As in FIG. 2A, data keys 210 or other conventional means can be employed to selected among the channels of tunable input devices.

Figure 2C:
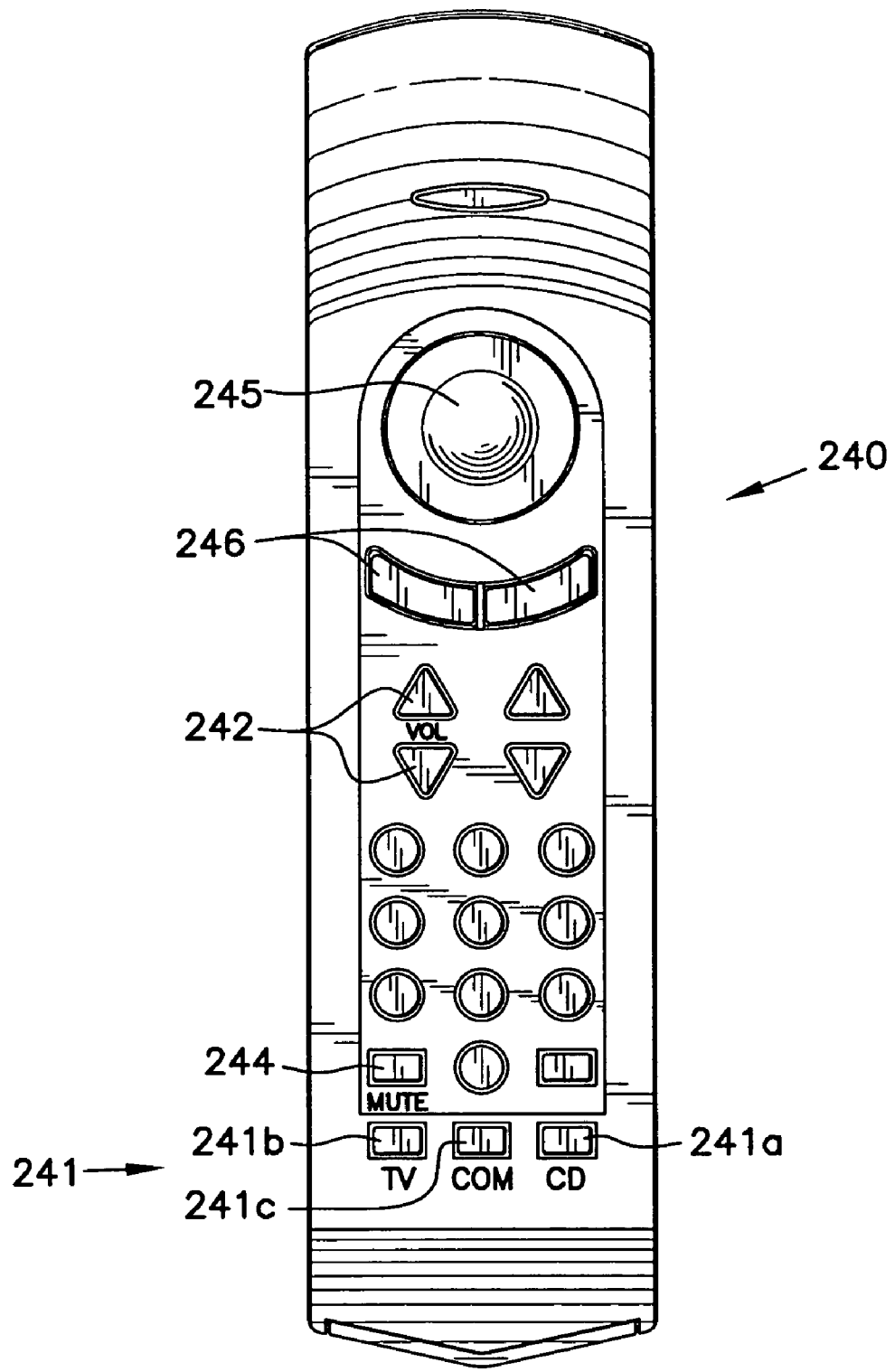

FIG. 2C shows an alternative user input device 155 in the form of a wireless hand-held remote control 240. Source-selection buttons 241 correspond to buttons 231 in FIG. 2B. Button 241*a* selects a CD player such as 171*f*, FIG. 1, as the media source; button 241*b* selects TV tuner 171*a*; and button 241*c* selects the systems network interface device 155. Buttons 242 control the volume of the selected device, similarly to buttons 232 of FIG. 2B. Mute button 244 performs the function of button 234.

Figure 2D:
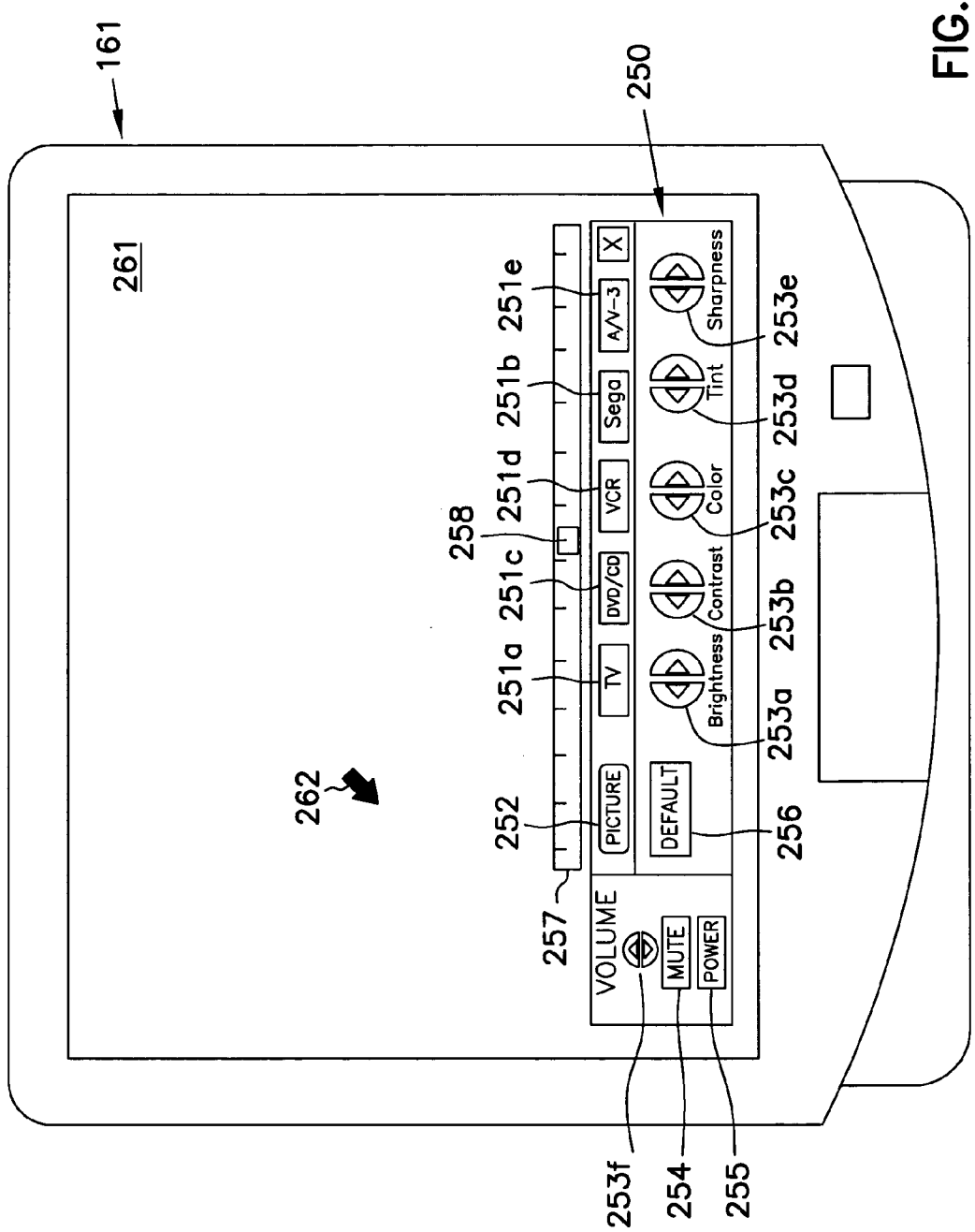

Numeral 245 indicates a trackball, and 246 represents conventional left/right selection buttons for the trackball. These are used in connection with the alternative interface described in connection with an alternative interface, shown in FIG. 2D. Here, the screen 261 of monitor 161, FIG. 1, displays a cursor 262 controlled by trackball 245 and selection buttons 246 of wireless remote 240, FIG. 2C, for engaging a graphical user interface (GUI) 250 displayed on the screen. That is, the user may select a source device by placing cursor 262 on control buttons 251a-251e and pressing the left selection button 246 on the remote. Control 252 selects and deselects this group of video sources. Clicking on controls 253a-253e increases or decreases the indicated video parameters in the same way as does pressing the physical buttons 223a-223e in FIG. 2A. Control 253f varies the audio volume. Control 254 provides a 'mute' function, and 255 controls the device power. Clicking button 256 returns all parameters to default values. These values can be hardwired into each video source device, set by the user in a preferences mode, or established in any other convenient manner. Control 257 provides an alternative to buttons 253 for varying the parameters. When a user deselects one of the parameters 253a-253f, dragging the slider 258 with trackball 245 changes the parameter.

FIG. 3A represents a table 300 stored in memory 120 of system 100, FIG. 1. Table 300 has a number of rows or entries 310, one for each media source 171 in the system, as indicated by the legends at the left of the table. Each entry contains a number of cells such as 321 that, taken together, define a number of columns 320. Each table cell contains a digital quantity representing a value for the parameter named at the top of the columns. If each table cell is one byte, for example, values from '0' to '255' in column 320a may represent brightness from completely dark to a maximum for monitor 161, with '128' being an approximate midpoint value. Of course, values may run in the other direction for some or all parameters, and some or all of the table values may be logarithmic or any other function of the actual parameter valued for the associated output device 160. It is of course possible to assign different directions and different functions for different parameters, and for the same parameter for different devices—that is, for the same column in different entries in the table. Also, different parameters may have different lengths than others, giving greater or less resolution for some parameters. The entries for strictly audio devices, such as 'CD1', possess columns for video parameters inapplicable to them; the values for these cells are irrelevant, and are shown blank. To save some memory space, rows 310f-310i may be removed and columns 320f-310i thereof stored as a separate subtable 330. Linked lists or other data structures may be used instead of table 300 as a structure for holding the parameter values of all the sources, if desired.

Figure 3B:
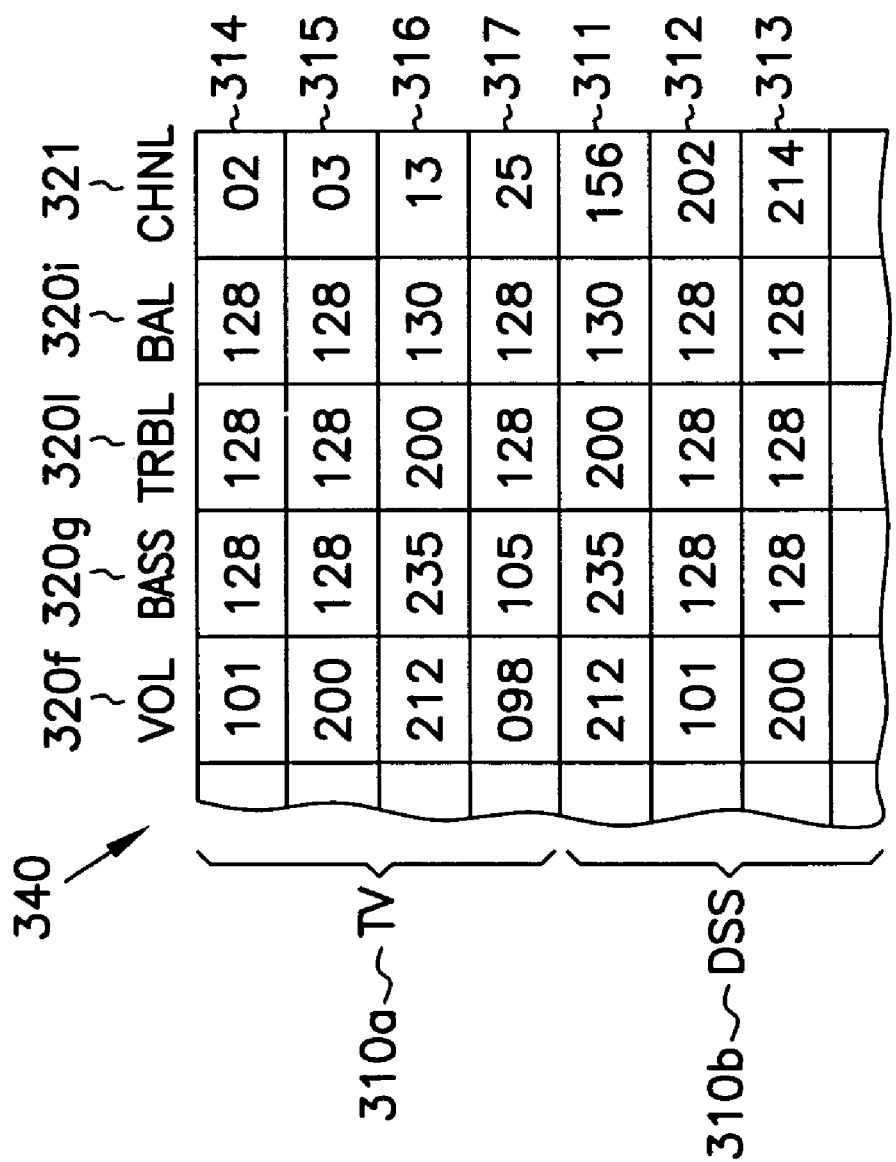

FIG. 3B shows part of an expanded table 300, labeled as table 340. This version establishes a set of profiles, not only for multiple input devices, but also for multiple channels within tunable devices capable of receiving many input signals or channels. Table 340 adds a column 321 designating channel numbers for each device. These numbers may represent physical channels, or they may correspond to internally generated logical channel designations.

For example, the single record 310b for DSS receiver 171b becomes multiple records such as 311-313. Record 311 may correspond to a movie channel ('156') on the satellite system, where the user desires a high audio volume, maximum bass, and enhanced treble. Record 312 may represent a news network (channel '202') having a low volume suitable for background listening. Record 313 may correspond to a sports channel where the user wishes a high volume but no enhanced bass or treble. Records 314-317 represent similar individual channel-parameter profiles for TV tuner 171a, FIG. 1. Other parameters not shown in expansion 340 can also participate in the per-channel profiles. It is, of course, possible to provide for further types of user profile as well, based upon factors other than, or in addition to, channels.

Tables 300 and its variants must persist over multiple user sessions, between which system 100 might be powered off or memory 120 made unavailable for some other reason. Therefore, although table 300 is normally stored in RAM while in use, it should be also stored in a nonvolatile location, such as on hard disk 131. Alternatively, table 300 need not exist as a unified memory structure at all. It is entirely possible to store, for example, entry 310a for TV 171a in a nonvolatile register 179 associated with master controller 177. It is also possible to store the video parameters for all media devices producing a video signal in a subtable containing the first five columns and the first five rows of table 300, within monitor 161, and to store the audio parameters for all media devices producing an audio signal in another subtable, containing the last four columns for all nine entries, physically within system audio device 162.

A software architecture for managing the hardware of a multimedia convergence system 100 is shown in the aforementioned U.S. patent application Ser. No. 09/002,828. Generally, a convergence system operates at least partially under the control of a standard operating system, such as Microsoft® Windows®. In addition, the aforementioned application describes a number of specific systems services, drivers, and interfaces that, although not necessary for implementing the present invention, provide a background for the functions described in the paragraphs below.

Figure 4:
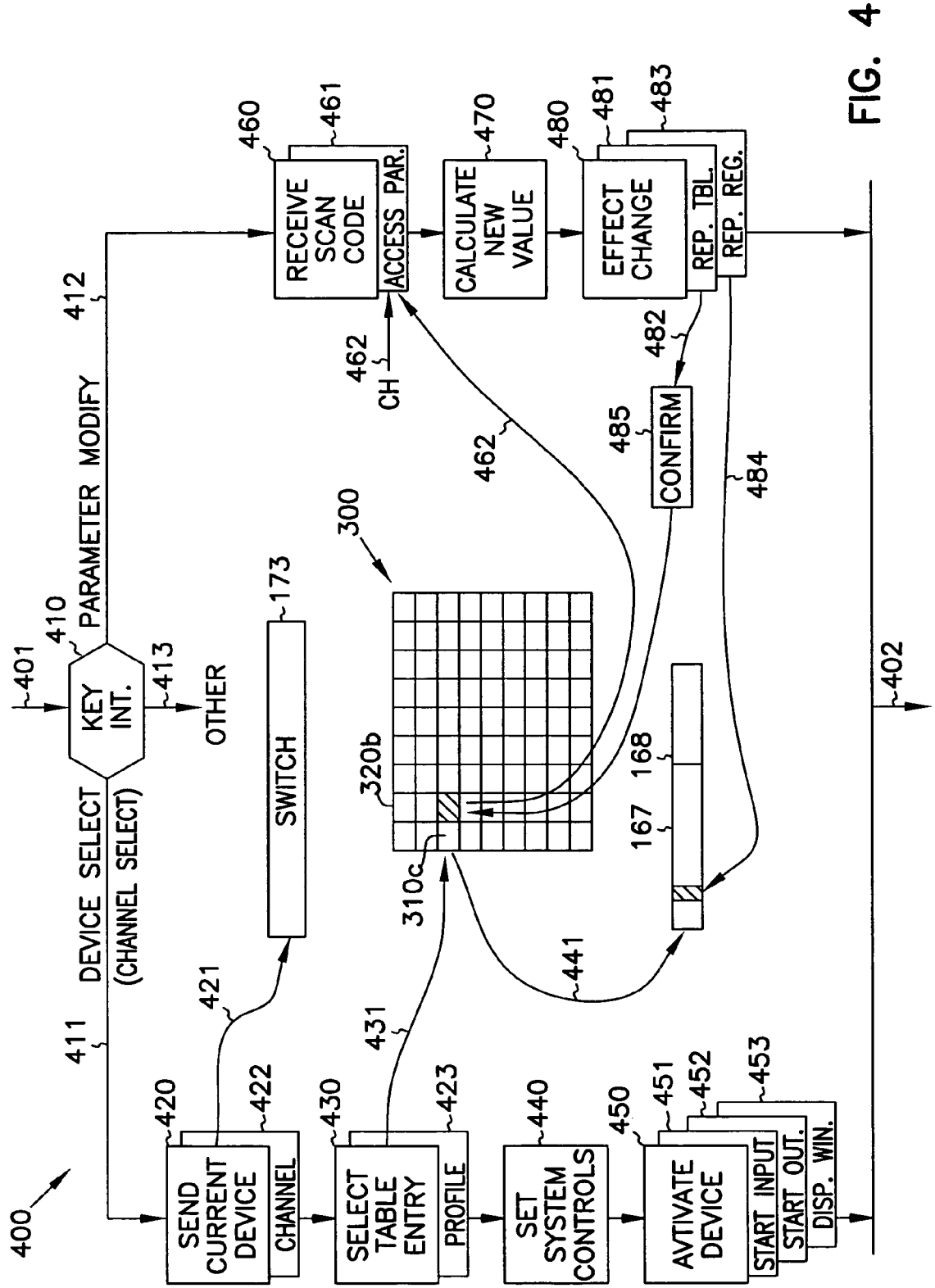
FIG. 4 is a flowchart of a method of controlling multimedia parameters according to the invention.

FIG. 4 is a flowchart 400 showing how system 100 controls and modifies multimedia parameters while presenting media signals from different input devices 170 to the set of common system output devices 160, FIG. 1. Flowchart 400 begins at entry point 401.

When a user presses one of the buttons in media-input facility 155, step 410 generates a conventional keyboard interrupt and passes the scan code on output 411 for a device-select button such as 221 or 231, output 412 for a parameter button such as 222 or 232, and to output 413 for data-entry keys 210 or for another type of media-control button, such as mute 234, FIG. 2. (The scan code, or an equivalent interrupt signal, could also come from a scheduler or other service provided by the software of system 100.)

For a device-selection call 411, step 420 sends a selection signal 421 to switch 173, FIG. 1, connecting the selected media input device 171a-171i to the system output devices 161, 162, etc. Step 430 accesses the appropriate entry or row of table 300, such as entry 310c, as indicated by arrow 431. Step 440 then transfers all the parameters in columns 320 of the selected entry to the control registers 167, 168 of the appropriate output devices, as symbolized at 441. This step may take a number of forms, depending upon the location of table 300 and registers 167 and 168 within system 100, and may in some cases not require any actual transfer of data from one location to another. Step 450 completes the device selection. Usually, this entails activating the selected input device 171 at substep 451; it may also include turning on or reconfiguring an output device in subsystem 160 at substep 452, display a configuration window on monitor 161 (substep 453), and other functions. Completion of the last function in step 450 returns control at exit point 402 to whatever other routine was interrupted at entry point 401.

A parameter-modification call 412 receives the parameter-control scan code at step 460, for the proper parameter for the currently selected input device in table 300. For example, an "increase contrast" scan code requires accessing the contents of the "contrast" column 320b at "DVD" entry 310c, as shown at 461 and 462. Step 470 then determines the new value of this parameter. Many methods may be appropriate for calculating a new value, and different methods may be employed for different parameters. For example step 470 may increment it or decrement the value, look up a new value in the next or previous row of a function table (not shown), carry out a numerical calculation, or perform any of a number of similar operations. Step 480 then effects the parameter change. Substep 481 replaces the previous value of the cell accessed at 462 with the value produced in step 470, as indicated at 482. Substep 483 replaces the current parameter value in device register 167 or 168 with the new parameter value, as shown at 484. Control then passes to exit 402, as before. Flowchart 400 generally follows the functions described above in connection with FIG. 2A.

In addition to providing separate parameter settings for different devices, the present system can also implement multiple profiles for some input devices 171. For example, a user may desire different parameter settings for different channels on a tunable device such as a TV tuner or DSS receiver. When this feature is desired, step 410 passes control on line 411 not only for device selection, but also when the user selects a channel in a tunable input device. Block 422 switches the current device to the chosen channel. Block 432 accesses the profile record in the expanded form 340 of table 300 corresponding to the particular channel of the current device, as read from column 321, FIG. 3B. Block 440 sets the system controls as before, but now with the parameter values of the profile for the selected channel, rather than with generic values for the input device as a whole.

When the channel profiles are in use, modifying a parameter via line 412 causes block 461 to access parameters of the selected profile for the current input device. Channel input 462 can obtain a designation of this channel from blocks 422 and/or 432. When block 481 later writes the new parameter values into the expanded form of the table 300, it places them in the profile for the current channel.

Although channel-parameter changes are made in device registers 167 and 168 immediately, it might be desired in some cases to have block 481 delay writing the new values into the table until the user exits the channel, selects "save" on the user input device, or until some other event occurs. Also, it may be desirable to ask the user to confirm certain changes before they are written back to the table profile. For example, the user may have lowered the audio volume drastically in order to answer a telephone call. Block 485 requests confirmation of certain changes, such as a drastic parameter variation, and blocks changes that are not confirmed.

Other features may be included as well. For example, some or all of the input devices 171 can have default values defined by the hardware or by the user. Certain devices or certain profiles may contain a lock to prevent any user changes to the stored parameter values.

Figure 5:
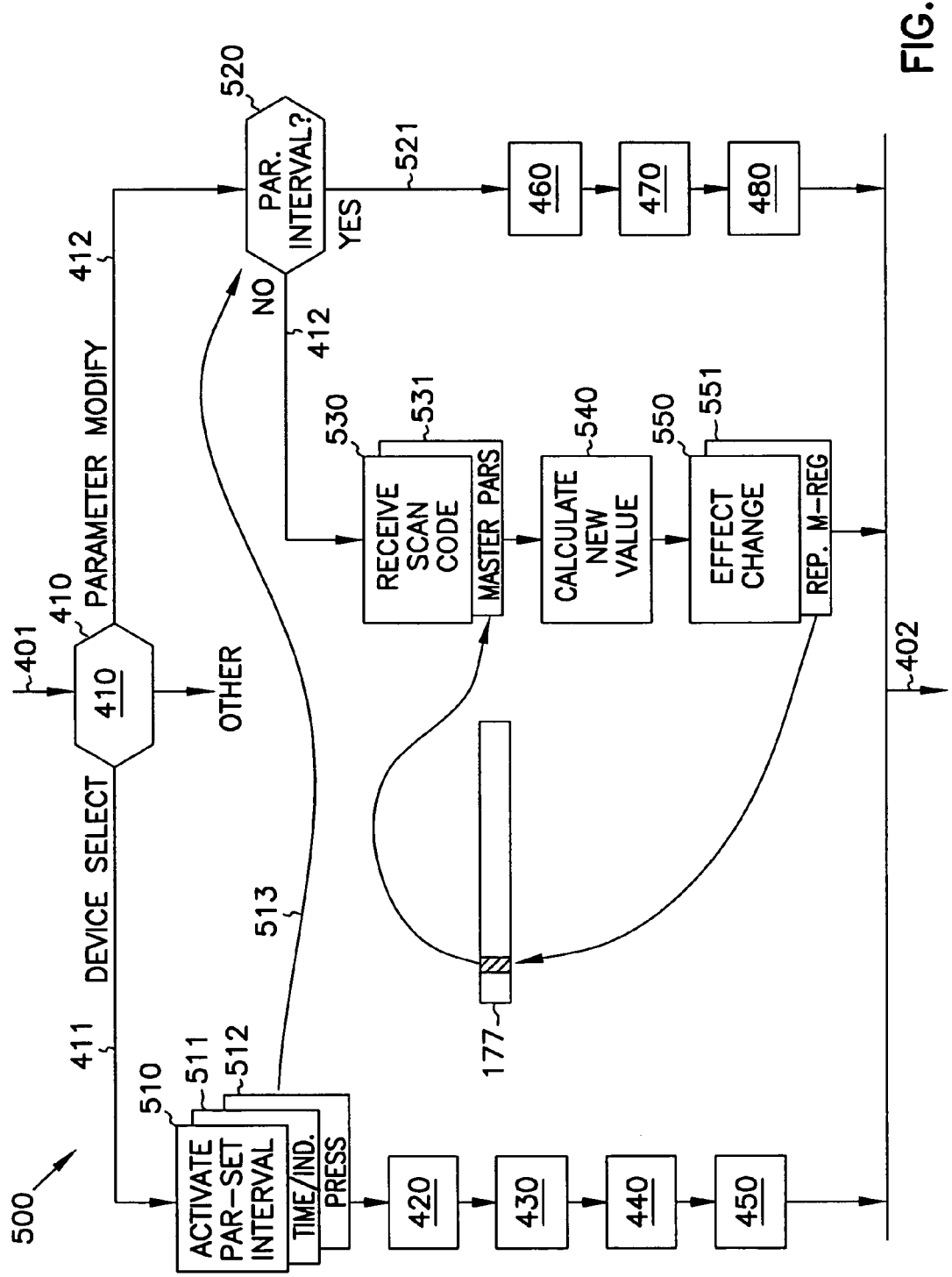
FIG. 5 is a flowchart of another method of controlling multimedia parameters according to the invention.

FIG. 5 is a flowchart 500 showing method steps for implementing the functions described in connection with FIG. 2B. Steps shared with flowchart 400 are shown reduced in FIG. 5. In method 500, the recognition of a device-selection button press at 411 activates a parameter-set interval at step 510; during this interval, one or more parameters may be modified. One way to define this interval is by a fixed-period timeout, as at 511. A visible or audible indicator may signal this interval to the user. Alternatively, substep 512 may continue the interval as long as a device-selection button is held down. At the expiration of the parameter-set interval, step 510 passes control to steps 420-450 as in FIG. 4.

During the interval activated by step 510 (indicated by arrow 513), step 520 passes control via exit 521 to blocks 460-480 to modify parameter values for individual devices as shown in FIG. 4. At other times, however, exit 522 passes control to step 530. This step receives the scan code from the button press or other source, and substep 531 accesses from master controller 177 the parameter value indicated by the scan code. Step 540 determines the new value of that parameter, preferably in the same way as does step 470. Step 550 then writes the new parameter value back into master controller register 177, and exits at point 402.

Although specific embodiments have been illustrated and described herein, those of ordinary skill in the art will appreciate that any elements or arrangements of elements capable of achieving the same purpose may be substituted for the specific forms shown. This patent is intended to cover all adaptations or variations of the invention, limited only by the following claims and equivalents thereof.

We claim:

1. A method for controlling a multimedia system configured to receive a plurality of input signals received from a plurality of different media devices and present media from at least one of said input signals through at least one output device, said method comprising:
   receiving, at said multimedia system, the plurality of input signals, each of the plurality of different media devices being associated with a respective one of the plurality of input signals;
   modifying the plurality of input signals to obtain a system level baseline according to system baseline values stored in the multimedia system for the plurality of different media devices without selecting a media device;
   selecting one of said signals in response to a selection command to said system;
   retrieving, from a table of parameter entries associated with said signals, at least one value of a parameter corresponding to said one selected signal, wherein each of said parameter entries is associated with one of said plurality of input signals;
   modifying said one signal in accordance with said at least one retrieved parameter value to produce a modified one signal, said at least one retrieved parameter value controlling presentation of the media by said output device;
   transmitting said modified one signal to said output device; and
   presenting the media from said modified one signal by said output device;
   wherein the modifying of said one signal is performed in response to the selecting of said one selected signal; and
   wherein said one selected signal comprises multiple channels.

2. A method according to claim 1, wherein said output device is one of a plurality of output devices;
   wherein each of said parameter entries holds multiple values each corresponding to one of said plurality of output devices.

3. A method according to claim 2, wherein said output device is a first output device and said plurality of output devices comprises a second output device;
   wherein a first group of said parameter entries controls the presentation of media from the first output device, and a second group of said parameter entries controls the presentation of media from the second output device.

4. A method according to claim 1, wherein said selecting step comprises:
receiving a selection code representing said one signal; and
switching said one input signal to said one output device.

5. A method according to claim 1, comprising the further steps of:
receiving a parameter code for modifying the value of said parameter for only a particular one of said media devices;
producing a modified value of said parameter in response to said code;
storing said modified parameter value in an entry of said table corresponding to said particular one input signal; and
thereafter, presenting media from said selected signal by said output device in accordance with said modified parameter value.

6. A method according to claim 5, wherein said particular one signal is said one of said signals currently selected in response to said selection command.

7. A method according to claim 5, wherein said parameter code is received from a user.

8. A method according to claim 5, wherein each of said table entries holds multiple values each corresponding to a different one of a plurality of parameters associated with the presentation of media from said input signals.

9. A method according to claim 8, wherein said parameter code further specifies a particular one of said parameters as said parameter to be modified.

10. A method according to claim 1, wherein said plurality of different media devices comprise at least two media devices from the group consisting of a TV tuner, a direct satellite receiver, a DVD player, a video tape recorder, a CD player, and a MIDI port.

11. A method according to claim 1, wherein said one selected signal is a first input signal, said at least one retrieved parameter value is a first retrieved parameter value, and said modified one signal is a first modified signal, the method further comprising:
selecting a second input signal for presentation instead of the first input signal;
modifying said second input signal in accordance with a second retrieved parameter value to produce a second modified signal;
transmitting said second modified signal to said output device; and
presenting the media from said second modified signal to said output device.

12. A method according to claim 11, wherein said first input signal is associated with a media device selected from a group consisting of a TV tuner, a direct satellite receiver, a DVD player, a video tape recorder, a CD player, and a MIDI port; and
wherein said second input signal is associated with a different media device than that associated with the first input signal.

13. A method according to claim 1, wherein said parameter entries are configured for multiple user sessions independent of any single user preferences.

14. A method according to claim 1, wherein said parameter entries do not depend upon an identity of a user performing the selecting of said one of the signals.

15. A method according to claim 1, wherein each of said plurality of input signals is associated with at least one of said parameter entries for a given type of parameter, wherein the given type of parameter is selected from a group consisting of audio volume, bass, treble, balance, video brightness, contrast, color, tint, and sharpness.

16. A multimedia system for receiving a plurality of media signals from a plurality of different media devices and producing an output signal derived from one input signal of said media signals on an output device for said system, each of the plurality of different media devices being associated with a respective one of the plurality of media signals, said system comprising:
an input device, responsive to a selection command, for selecting said one input signal;
a switch for transmitting the one input signal selected from said plurality of said media signals from said plurality of different media devices to said output device in response to said selection command;
a table having a plurality of entries each holding a value of at least one parameter of said output signal, different ones of said entries being associated with different ones of said media signals;
a plurality of registers for storing system baseline values for the plurality of different media devices;
a processor, responsive to said selection command, for accessing one of said values from said table, the one value accessed by the processor being in an entry corresponding to said selected one input signal, the processor further being capable of modifying said plurality of said media signals to obtain a system level baseline according to the system baseline values stored in the plurality of registers without selecting a media device; and
an output controller coupled to said output device for setting said at least one parameter of said output signal in accordance with said one value, said at least one retrieved parameter controlling presentation of media by said output device;
wherein said selected one input signal comprises multiple channels.

17. A multimedia system according to claim 16, wherein said input device is a keyboard having a number of buttons for producing said selection command.

18. A multimedia system according to claim 17, wherein said system includes a data processor coupled to said output device for presenting signals to be presented thereon, and wherein said keyboard also includes an array of data-entry keys for the data processor.

19. A multimedia system according to claim 16, wherein said input device is further adapted to produce a parameter modification command, and wherein said table is adapted to store a modified value of said parameter in one of said table entries so as to affect the value of said parameter only for one of said media signals associated with said one table entry.

20. A multimedia system according to claim 19, wherein said input device has a number of buttons for producing said parameter modification command.

21. A multimedia system according to claim 20, wherein said input device is coupled to said system by a wireless link such that said parameter modification command can be performed by a user from a position from which said output device is normally viewed.

22. A multimedia system according to claim 20, wherein the parameter of said output signal is at least one of the group comprising an audio volume, bass, treble, and balance.

23. A multimedia system according to claim 20, wherein the parameter of said output signal is at least one of the group comprising video brightness, contrast, color, tint, and sharpness.

24. A multimedia system according to claim 20, further comprising an output device coupled to said output signal.

25. A multimedia system according to claim 20, wherein said output device includes a video monitor.

26. A multimedia system according to claim 20, wherein said output device includes a sound system.

27. A multimedia system according to claim 16, wherein said media devices comprise at least two media devices from the group consisting of a TV tuner, a direct satellite receiver, a DVD player, a video tape recorder, a CD player, and a MIDI port.

28. A multimedia system according to claim 16, wherein said at least one parameter of the one input signal is modified in producing said output signal having said at least one parameter set in accordance with said one value.

29. A multimedia system according to claim 16, wherein each of the plurality of said media signals is associated with at least one of said plurality of entries for a given type of parameter, wherein the given type of parameter is selected from a group consisting of audio volume, bass, treble, balance, video brightness, contrast, color, tint, and sharpness.

30. A multimedia system comprising:
a plurality of media devices, each providing a different media signal so that each of said plurality of media devices provides one of the media signals;
a presentation device having parameters for controlling the presentation of media from said media signals received from the media devices;
an input device, responsive to a selection command, for selecting one said media device and one said media signal from the one media device;
a switch, coupled to the media devices and the presentation device, for transmitting the selected one of the media signals to the presentation device in response to the selection command;
a table having a plurality of entries each holding values of the parameters for the presentation device based on the media device providing the media signal;
a plurality of registers for storing system baseline values for the plurality of different media devices;
a processor, responsive to said selection command, for accessing said values from said table, said values being in an entry corresponding to the media device providing the selected media signal, the processor further being capable of modifying said plurality of said media signals to obtain a system value baseline according to the system baseline values stored in the plurality of registers without selecting a media device; and
an output controller coupled to said switch and configured to modify the selected one of the media signals in accordance with said values for transmitting to the presentation device, said value controlling presentation by said presentation device of the media from the modified one of the media signals;
wherein the selected media signal comprises multiple channels.

31. A multimedia system according to claim 30, wherein said plurality of different media devices comprise at least two media devices from the group consisting of a TV tuner, a direct satellite receiver, a DVD player, a video tape recorder, a CD player, and a MIDI port.

32. A multimedia system according to claim 30, wherein each of said media signals is associated with at least one of said plurality of entries for a given type of parameter, wherein the given type of parameter is selected from a group consisting of audio volume, bass, treble, balance, video brightness, contrast, color, tint, and sharpness.

33. A multimedia system comprising:
a plurality of media devices, each providing a different media signal so that each of said plurality of media devices is configured to provide media from one of the media signals;
a presentation device having parameters for controlling the presentation of the media from media signals received from the media devices;
an input device, responsive to a selection command, for selecting a media device and media signal from the media device;
a switch, coupled to the media devices and presentation device, for transmitting a selected one of the media signals to the presentation device in response to the selection command;
a table having a plurality of entries each holding values of one of the parameters for the presentation device based on the media device providing the media signal;
a plurality of registers for storing system baseline values for the plurality of different media devices;
a processor, responsive to said selection command, for accessing a value from said table, said value being in an entry corresponding to the media device providing the selected media signal, the processor further being capable of modifying said plurality of said media signals to obtain a system level baseline according to the system baseline values stored in the plurality of registers without selecting a media device; and
an output controller coupled to said switch and configured to modify the selected one of the media signals in accordance with said value for transmitting to the presentation device, said value controlling presentation by said presentation device of the media from the modified one of the media signals;
wherein the selected media signal comprises multiple channels.

34. A multimedia system according to claim 33, wherein said plurality of different media devices comprise at least two media devices from the group consisting of a TV tuner, a direct satellite receiver, a DVD player, a video tape recorder, a CD player, and a MIDI port.

35. A multimedia system according to claim 33, wherein each of said media signals is associated with at least one of said plurality of entries for a given type of parameter, wherein the given type of parameter is selected from a group consisting of audio volume, bass, treble, balance, video brightness, contrast, color, tint, and sharpness.

36. A multimedia system that receives media signals from a plurality of different media devices and provides said media signals to a presentation device for presentation of media from media signals received from the media devices, each of the plurality of different media devices being associated with a respective one of the media signals, said system comprising:
an input device, responsive to a selection command, for selecting a media device and associated media signal from the media device;
a table having a plurality of entries each holding values of parameters for controlling the presentation device based on the media device providing the media signal;
a plurality of registers for storing system baseline values for the plurality of different media devices;
a processor, responsive to said selection command, for accessing said values from said table, said values being in an entry corresponding to the media device providing the selected media signal, the processor further being capable of modifying said plurality of said media signals to obtain a system level baseline according to the system baseline values stored in the plurality of registers without selecting a media device; and an output controller coupled to said switch and configured to modify the selected one of the media signals in accordance with said values for transmitting to the presentation device, said values controlling presentation by said presentation device of the media from the modified one of the media signals;

wherein the selected media signal comprises multiple channels.

37. A multimedia system according to claim 36, wherein said plurality of different types of media devices comprise at least two types of media devices from the group consisting of a TV tuner, a direct satellite receiver, a DVD player, a video tape recorder, a CD player, and a MIDI port.

38. A multimedia system according to claim 36, wherein each of said media signals is associated with at least one of said plurality of entries for a given type of parameter, wherein the given type of parameter is selected from a group consisting of audio volume, bass, treble, balance, video brightness, contrast, color, tint, and sharpness.

39. A computer-readable medium containing computer instructions and data for controlling a multimedia system configured to receive a plurality of input signals from a plurality of different media devices and present media from at least one of said input signals through at least one output device, said instructions and data for carrying out operations of:

receiving, at said multimedia system, the plurality of input signals, each of the plurality of different media devices being associated with a respective one of the plurality of input signals;

modifying the plurality of input signals to obtain a system value baseline according to system baseline values stored in the multimedia system for the plurality of different media devices without selecting a media device;

selecting one of said signals in response to a selection command to said system;

retrieving, from a table of parameter entries associated with said signals, at least one value of a parameter corresponding to said one selected signal;

modifying said one signal in accordance with said at least one retrieved parameter value to produce a modified one signal, said at least one retrieved parameter value controlling presentation of the media by said output device;

transmitting said modified one signal to said output device; and presenting the media from said modified one signal by said output device;

wherein the modifying of said one signal is performed in response to the selecting of said one selected signal; and wherein said one selected signal comprises multiple channels.

40. A computer-readable medium according to claim 39, wherein said output device is one of a plurality of output devices;

wherein each of said parameter entries is associated with one of said plurality of input signals; and wherein each of said parameter entries holds multiple values each corresponding to one of said plurality of output devices.

41. A computer-readable medium according to claim 40, wherein said output device is a first output device and said plurality of output devices comprises a second output device;

wherein a first group of said parameter entries controls the presentation of media from the first output device, and a second group of said parameter entries controls the presentation of media from the second output device.

42. A computer-readable medium according to claim 39, wherein said selecting step comprises:

receiving a selection code representing said one signal; and switching said one input signal to said one output device.

43. A computer-readable medium according to claim 39, wherein said one selected signal is a first input signal, said at least one retrieved parameter value is a first retrieved parameter value, and said modified one signal is a first modified signal, the method further comprising:

selecting a second input signal for presentation instead of the first input signal;

modifying said second input signal in accordance with a second retrieved parameter value to produce a second modified signal;

transmitting said second modified signal to said output device; and presenting the media from said second modified signal to said output device.

44. A computer-readable medium according to claim 43, wherein said first input signal is associated with a media device selected from a group consisting of a N tuner, a direct satellite receiver, a DVD player, a video tape recorder, a CD player, and a MIDI port; and wherein said second input signal is associated with a different media device than that associated with the first input signal.

* * * * *